(12) United States Patent
Hunt (10) Patent No.: US 10,959,563 B2
(45) Date of Patent: Mar. 30, 2021

(54) DRINK LAYERING METHODS AND APPARATUSES

(71) Applicant: Clayton Hunt, Thornton, CO (US)

(72) Inventor: Clayton Hunt, Thornton, CO (US)

(73) Assignee: Clayton Hunt, Thornton, CO (US)

( * ) Notice: Subject to any disclaimer, the term of this patent is extended or adjusted under 35 U.S.C. 154(b) by 742 days.

(21) Appl. No.: 15/693,984

(22) Filed: Sep. 1, 2017

(65) Prior Publication Data

US 2018/0055278 A1 Mar. 1, 2018

Related U.S. Application Data (60) Provisional application No. 62/382,470, filed on Sep. 1, 2016.

(51) Int. Cl.
*A47J 31/44* (2006.01)
*C12C 12/00* (2006.01)
*A47J 43/27* (2006.01)

(52) U.S. Cl.
CPC .......... *A47J 31/4496* (2013.01); *A47J 43/27* (2013.01); *C12C 12/00* (2013.01)

(58) Field of Classification Search
CPC ........ A47J 31/4496; A47J 43/27; C12C 12/00
USPC ........................................ 141/331–345, 365
See application file for complete search history.

(56) References Cited

U.S. PATENT DOCUMENTS

| | | | | |
|---|---|---|---|---|
| 1,302,086 A | * | 4/1919 | Melchior | B67C 11/02 141/340 |
| 1,368,640 A | * | 2/1921 | Melchior | B67C 11/02 141/340 |
| 2,509,098 A | * | 5/1950 | Howard | A01J 11/06 248/94 |
| 2,740,571 A | * | 4/1956 | Busto | A47J 43/27 141/94 |
| 3,185,189 A | * | 5/1965 | Reid | B67C 11/02 141/100 |
| 3,256,916 A | * | 6/1966 | Silletti | B67C 11/04 141/286 |
| 3,567,075 A | * | 3/1971 | Neri | B67D 3/02 222/129.4 |
| 4,126,164 A | * | 11/1978 | Magnifico | A47G 19/2205 141/100 |
| 4,800,934 A | * | 1/1989 | Boissoneault | B67C 11/02 141/106 |

(Continued)

*Primary Examiner* — Timothy L Maust
(74) *Attorney, Agent, or Firm* — Kilpatrick Townsend & Stockton LLP (57) ABSTRACT

An apparatus for layering fluids in a container is provided. The apparatus may include a first component and a second component. The first component may include a first extension, a second extension, and a support portion disposed between the first extension and the second extension. When the first extension and the second extension are supported by the top of the drinking container, the support portion may be disposed at a vertical opening into the drinking container. The second component may include an upper portion defining a basin and a plurality of apertures extending between the basin and an exterior of the upper portion, a middle portion, and a lower portion. The lower portion or the middle portion may be configured to be coupled with the support portion of the first component to suspend the second component at the vertical opening into the drinking container.

18 Claims, 10 Drawing Sheets

(56) References Cited

U.S. PATENT DOCUMENTS

| | | | | |
|---|---|---|---|---|
| 4,850,403 A * | 7/1989 | Wiese | ............... | B67C 11/02 |
| | | | | 141/95 |
| 5,163,488 A * | 11/1992 | Basch | ............ | A47G 19/2205 |
| | | | | 141/100 |
| 7,997,305 B2 * | 8/2011 | Haramis | ......... | A47G 19/2205 |
| | | | | 141/100 |
| 8,726,948 B2 * | 5/2014 | Haramis | ............ | A47G 21/00 |
| | | | | 141/100 |
| 8,875,753 B2 * | 11/2014 | Norris | ............. | A47G 21/00 |
| | | | | 141/333 |
| 2007/0235103 A1 * | 10/2007 | Taverna | ............ | A47G 19/00 |
| | | | | 141/100 |
| 2009/0152297 A1 * | 6/2009 | Oversteegen | ....... | B01F 5/205 |
| | | | | 222/129.4 |

* cited by examiner

DRINK LAYERING METHODS AND APPARATUSES

CROSS-REFERENCE TO RELATED APPLICATIONS

This application claims priority to Provisional U.S. Patent Application No. 62/382,470 filed Sep. 1, 2016, entitled, "DRINK LAYERING METHODS AND APPARATUSES," the entire disclosure of which is hereby incorporated by reference, for all purposes, as if fully set forth herein.

BACKGROUND OF THE INVENTION

Embodiments of the invention pertains to methods and apparatuses for layering two or more types of beers or other liquids in a glass. For example, embodiments herein pertain to methods and apparatuses for pouring a Black and Tan, a beer cocktail made by layering a dark beer on top of a light beer in a drinking container, without a significant mixing of the two liquids in the process.

In the past, inverted spoons and other methods have been used to control the descent of a top second layer of beer onto the top of a previously poured layer. While these methods are manageable, it can prove to be messy for the novice pourer. A first, dense light-colored beer is poured first in the glass, and then a second, less dense dark-colored beer is poured on top of the first. Thus, the second beer must be poured onto the first in a slow and controlled manner as to keep the two beers from mixing in the glass, giving rise to distinct layers of the two beers and not mixing them. Embodiments of the present invention aid the pourer, whether professional or novice, in pouring and layering beer in a more efficient and cleaner fashion.

BRIEF SUMMARY OF INVENTION

In one embodiment, an apparatus for layering drinkable fluids of different densities in a drinking container is provided. The apparatus may include a first component and a second component. The first component may include a first extension, a second extension, and a support portion disposed between the first extension and the second extension. The first extension and the second extension may be configured to be supported by a top of a drinking container such that when the first extension and the second extension are supported by the top of the drinking container, the support portion may be disposed at a vertical opening into the drinking container. The second component may include an upper portion defining a basin and a plurality of apertures extending between the basin and an exterior of the upper portion, a middle portion, and a lower portion. The lower portion or the middle portion may be configured to be coupled with the support portion of the first component to suspend the second component at the vertical opening into the drinking container.

In another embodiment, a method for layering drinkable fluids of different densities in a drinking container. The method may include disposing a first drinkable fluid into a drinking container having a vertical opening on a top of the drinking container. The method may also include suspending a first component at the vertical opening on the top of the drinking container. The method may further include coupling a second component to the first component such that the second component is suspended at the vertical opening. The method may additionally include disposing a second drinkable fluid into a basin defined by the second component. The method may moreover include draining the second drinkable fluid from the basin to an exterior of the second component via apertures defined by the second component. The method may furthermore include draining the second drinkable fluid from the exterior of the second component such that at least some portion of the second drinkable fluid is impeded from falling directly from the apertures into the drinking container by at least one portion of the second component that is of greater diameter than the exterior of the second component where the apertures meet the exterior of the second component.

BRIEF DESCRIPTION OF THE DRAWINGS

The present invention is described in conjunction with the appended figures.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, systems, processes, structures, techniques, and other elements in the invention may be discussed without unnecessary detail in order to avoid obscuring the embodiments.

Figures 1, 6:
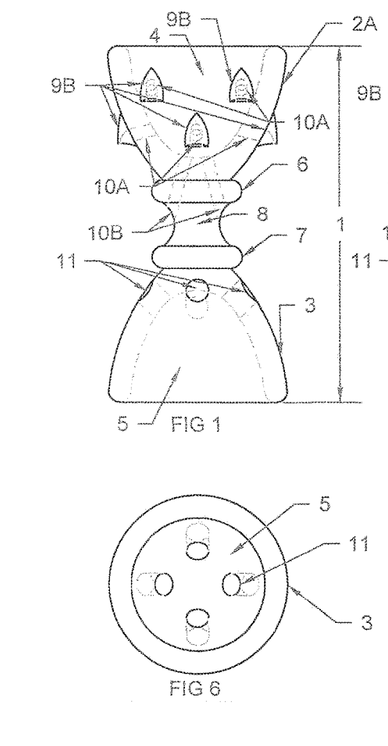
FIG. 1 shows a front view a first apparatus embodiment of the invention for layering fluids in a container.
FIG. 6 shows a bottom view of the embodiment of FIG. 1.
Figures 2, 3, 4:
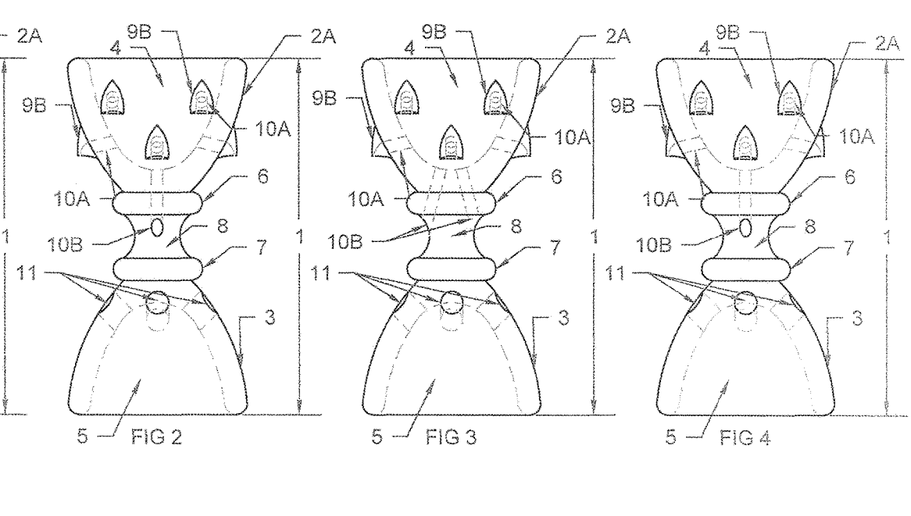
FIG. 2 shows a left side view of the embodiment of FIG. 1.
FIG. 3 shows a back view of the embodiment of FIG. 1.
FIG. 4 shows a right side view of the embodiment of FIG. 1.
Figure 5:
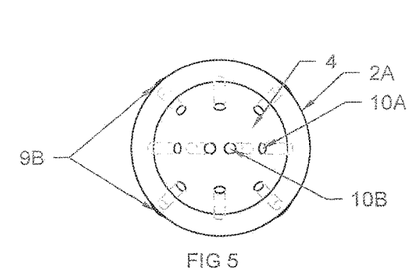
FIG. 5 shows a top view of the embodiment of FIG. 1.
Figures 7, 8:
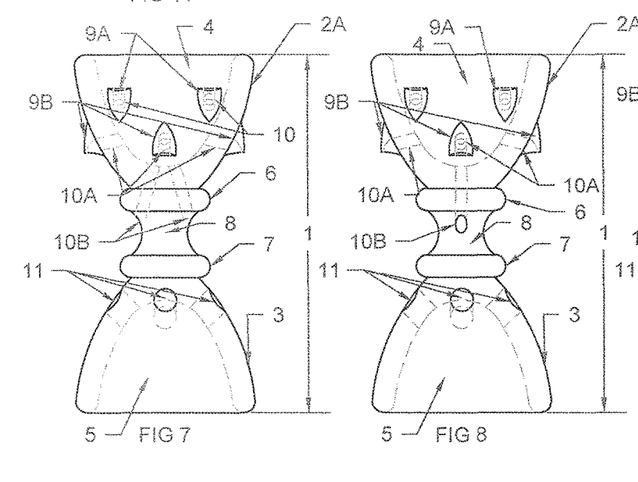
FIG. 7 shows a front view of a second apparatus embodiment of the invention for layering fluids in a container.
FIG. 8 shows a left side view of the embodiment of FIG. 7.
Figures 9, 10:
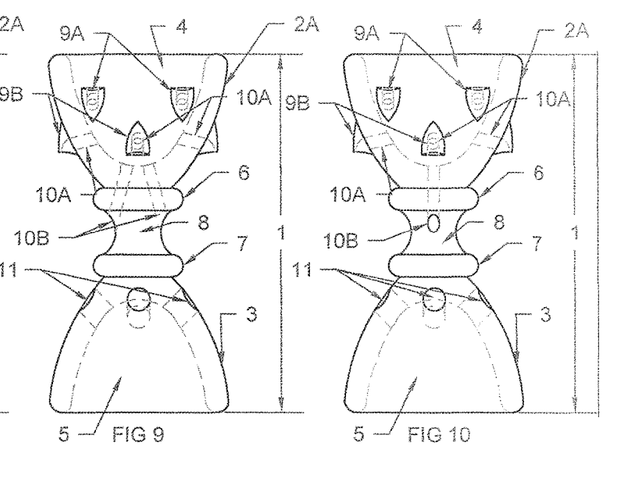
FIG. 9 shows a back view of the embodiment of FIG. 7.
FIG. 10 shows a right side view of the embodiment of FIG. 7.

The aforementioned design is a device that is used in the process of layering two or more beers in a glass. FIG. 1 shows the front view of the main body 1 and in a descending order from top to bottom, the illustration is as follows. The very top edges of the top part 2A of this device or main body 1 shows the smooth, rounded contour as part of the initial concept. The top part 2A is designed to be hollow on the inside 4 and may be conical or cylindrical within the interior of 2A. Top part 2A, and similar structures described herein, may be referred to as an "upper portion" of the main body 1 herein. The hollow portion, and other similar features described herein, may be referred to as a "basin" herein. On the outside of 2A is uniformly tapered on the exterior of 2A extending from a wider top to the narrower center which encompasses the top collar 6; the concentric, concave center 8 (this feature, and similar features herein, may be referred to as a "middle portion" herein) and the bottom collar 7. 6, 7, and 8 are all solid from the bottom of 2A to the top part of the tapered bottom 3 as shown in the drawings with the exception of the additional holes 10B, which may be as few as two but not limited to this as may require more or fewer as needed and may vary in size and configuration as well. The tapered bottom part of the main body 1 is the mirror image of the top portion 2A with the exception of having two to four holes 11 which may vary in diameter as found necessary for production. The bottom part 3 also shows the interior 5 to be hollow. The bottom part 3, or similar features described herein, may be referred to as a "lower portion." The hollow feature or interior 5 of bottom part 3, or similar features described herein, may be referred to herein as a "vertical receptacle". The holes of 11 pierce though the side walls of the tapered part 3 of the main body 1 in an oblique fashion allowing gas and the froth of the beer to pass through, equalizing the weight of the Hour Glass body 1 if necessary and may diversify the effects of the device as needed. In the center of the main Hour Glass or castle body 1 is the concentric concave center containing additional holes 10B which is additional drainage for the beer as it is poured into the upper part 2A, having its holes 10A, that may allow a more complete drainage of the beer from the top part 2A, leaving little to no beer remaining within the upper cavity 4. On the exterior of the said upper part of the device is one consideration of the concept where the faux windows 9B face downward and having holes 10A penetrating upward from the wider end of the faux windows through the side walls of 2A into the interior 4 of the top part 2A. The upper part 2A shows there are three faux windows per side and a total of eight on the circumference of the upper part 2A, as they represent equidistance in relation to one another in regards to the top row, the bottom row and each faux window of each row in relation to each other. As with the upper part 2A, the lower portion 3 is also rounded at the bottom edge leading into the hollow part 5. Any of the holes referred to herein, and similar features, may be referred to herein as "apertures." FIG. 2 is the left side view of the embodied design 1 as rotated 90 degrees counter-clockwise illustrating the same components as FIG. 1 yet illustrating that the holes 10B is now facing the observer, also showing that the other hole 10b is in direct relation to the opposite side, also containing another hole 10B. These two holes 10B within the concentric concave center, which run into the upper part 4 of 2A, may also contain additional holes on either side of the primary holes 10B of the same nature as needed as to provide better functionality or drainage (i.e., "drain conduits"). This view is showing the faux windows 9B; holes 10A and 11 to be of equidistance from one another lending to a uniform, sleek design. FIG. 3 continues the 90 degree counter-clockwise rotation showing the back with all components of the main embodiment 1. This view highlights the details of the main body 1; the upper part 2A; the upper cavity 4; the faux windows 9B of the upper part 2A with the interior holes 10A; this view also shows the tapering of the upper part 2A as it descends to the upper collar 6, the concentric, concave center 8 and down over the bottom collar 7 to the bottom part 3 as it flares outward toward the bottom end 3; at the bottom 3 contains the hollow cavity 5 and holes 11. "Faux windows," and similar features described herein, may also be referred to as "protrusions" herein. FIG. 4 continues the 90 degree rotation from the previous FIG. 3 showing the continuity of the main body 1. From the top, the hollow cavity 4 of the upper part 2A is shown along with the faux windows 9B; the holes 10A within the faux windows which penetrate the side wall of 2A continuing into the cavity 4. The holes, 10A; 10B and 11 may be construed as being bi-directional as penetrating the respective side walls and connecting interior and exterior of the embodiment and as related to the intention of said embodiment. This view also shows the concentric, concave center 8 along with the top collar 6 and bottom collar 7. Continuing down said device is the bottom part 3 and the hollow cavity 5. FIG. 5 shows the Top view of the apparatus as looking downward into the hollow portion 4 of the top end 2A, exposing the cross section of the piece and showing the holes 10A and 10B respectively within the top half 2A. FIG. 6 shows the bottom view of the apparatus as looking up from underneath showing the cross section and related holes 11 within the hollow end 5 of the bottom portion 3. In some embodiments, the body of top part 2A may also or alternatively include apertures that feed from the interior of the upper basin, and spiral around the body of the device to exit at a lower point thererfrom.

Figure 11:
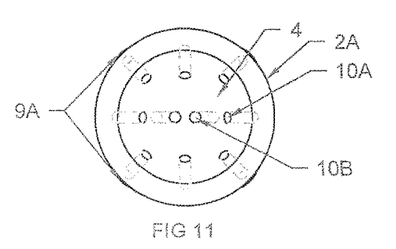
FIG. 11 shows a top view of the embodiment of FIG. 7.
Figure 12:
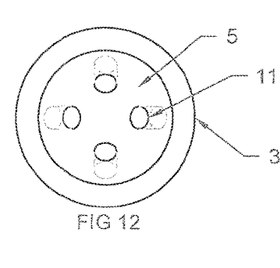
FIG. 12 shows a bottom view of the embodiment of FIG. 7.

FIGS. 7-12 show a different embodiment with all related parts as previously stated with the exception of the faux windows 9A in relation to the faux windows 9B in the top part 2A of the main body 1 as a variation to the main body design 1 as the faux windows are turned upward. The upper part 2A may contain both the upper facing windows 9A and the downward facing faux windows of 9B or only 9A or 9B respectively. Both, faux windows, 9A and 9B are open at the widest part of said faux windows which may resemble the contour of a strawberry planter having the basic shape but varying functionality in that the intended purpose, one being for drainage of excess liquid, the strawberry planter and the other, the Hour Glass or castle shape of the main body 1, being for the controlled flow of liquid to be consumed by individuals from a glass. FIG. 11 shows the same contour design of the main body 1 with the holes 10A and 10B as envisioned but is not to be construed as to the limitation of such holes as illustrated as the precise number of holes and the size may vary as needed in the configuration. The configuration may also vary as needed. FIG. 12 shows the bottom part 3 of the main body 1 and cavity 5 and holes 11. The holes 11 may be in different configuration, number, and diameter as found necessary and may not be static, rather fluid in design.

Figures 13, 14, 17:
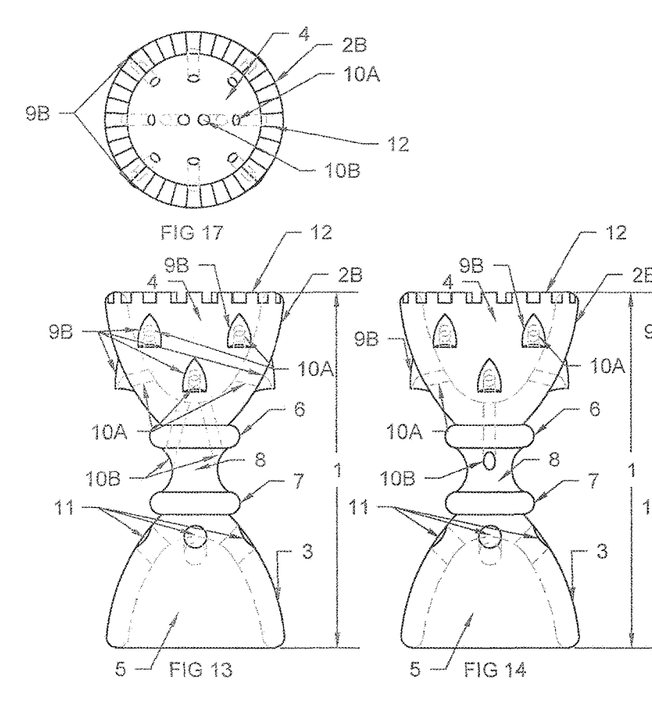
FIG. 13 shows a front view of a third apparatus embodiment of the invention for layering fluids in a container.
FIG. 14 shows a left side view of the embodiment of FIG. 13.
FIG. 17 shows a top view of the embodiment of FIG. 13.
Figure 15:
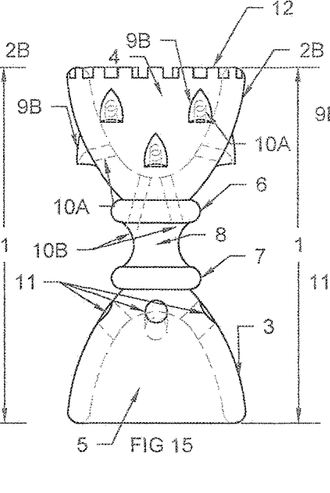
FIG. 15 shows a back view of the embodiment of FIG. 13.
Figure 16:
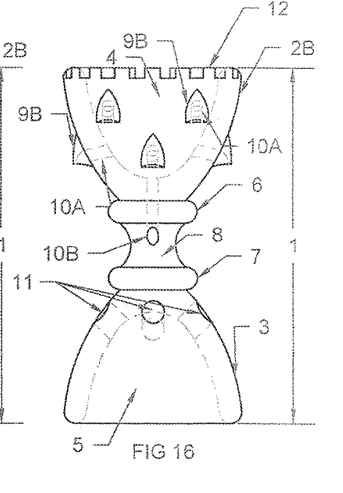
FIG. 16 shows a right side view of the embodiment of FIG. 13.
Figure 18:
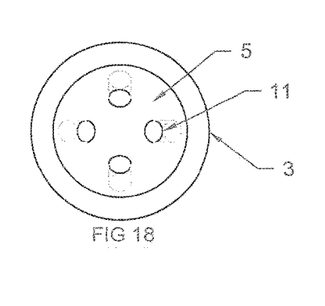
FIG. 18 shows a bottom view of the embodiment of FIG. 13.
Figure 19:
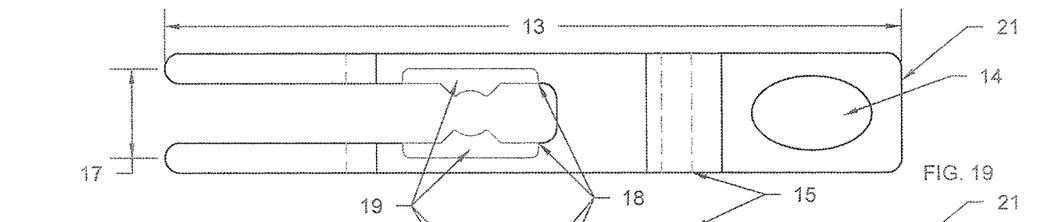
FIG. 19 shows a top view of an additional apparatus used in some embodiments of the invention for holding devices such as those shown in FIGS. 1-18 to thereby implement methods of the invention for layering fluids in a container.

FIGS. 13-18 show a different embodiment with the basic configuration similar to FIGS. 1-6 with an alternate design application showing battlements 12 to the top 2B and varied from 2A in FIG. 1, replacing the smooth contour of 2A with the battlements 12 in the upper part 2B, lending to a dynamic design variation. FIG. 17 illustrates the said battlements as viewed from the cross section of the top part 2B. This view also shows the liquid drainage holes of 10A and 10B. FIG. 18 remains the same as previous FIG. 6 and FIG. 12. FIG. 17 is a top view as looking down into the top hollow portion, 2B, as it continues down into the solid center of the Hour Glass. This view showcases the battlements 12, and holes 10A and 10B as shown. FIG. 18 shows the bottom view 3, as looking up into the hollow end of the piece. This view shows the hole configuration 11 and the hollow end 5 of the bottom portion 3 as envisioned.

Figure 20:
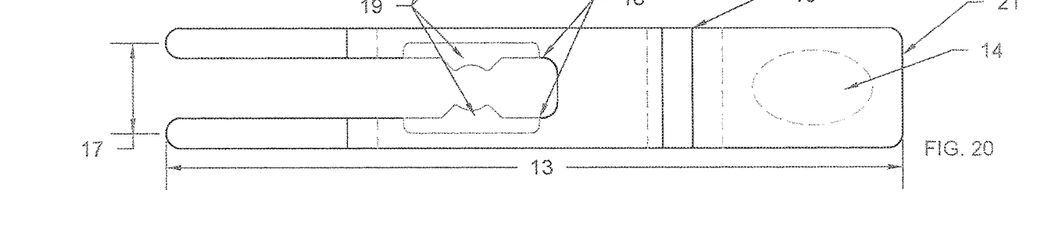
FIG. 20 shows a bottom view of the apparatus of FIG. 19.
Figures 21, 22, 23, 24:
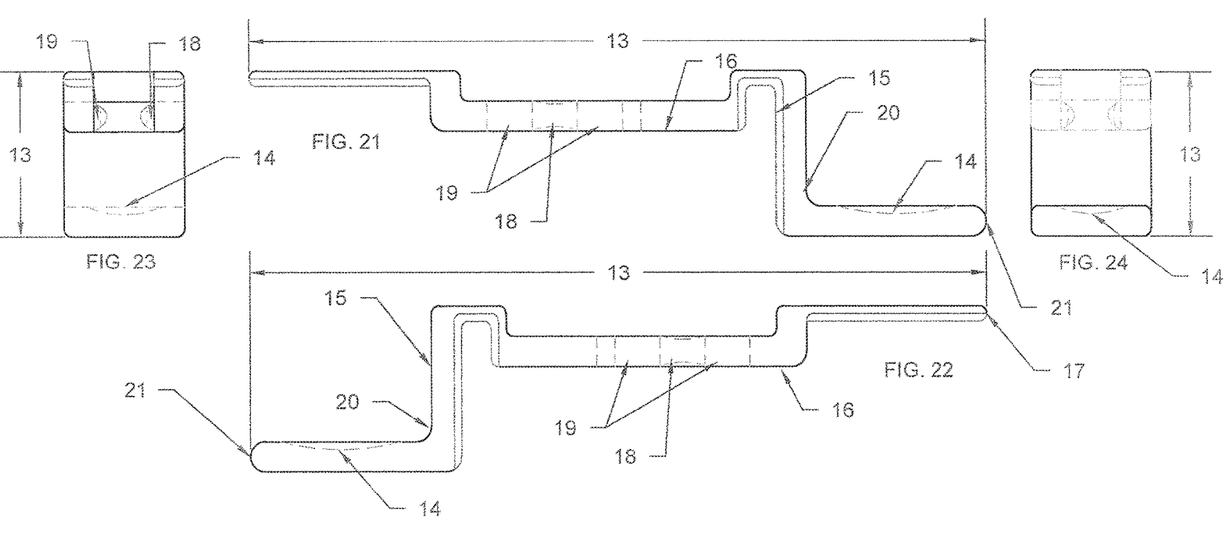
FIG. 21 shows a left side view of the apparatus of FIG. 19.
FIG. 22 shows a right side view of the apparatus of FIG. 19.
FIG. 23 shows a front view of the apparatus of FIG. 19.
FIG. 24 shows a back view of the apparatus of FIG. 19.

FIGS. 19-24 show the main body 13 of the handle apparatus used to hold the "Hour Glass" within a glass 21, rim to rim. This view is the view looking downward at the handle showcasing the individual parts of the handle 13. These figures highlight the main body indentation for thumb, 14, in the lowest portion of the handle 20, as an indentation suitable for an ergonomic fit. It also shows the forked portion 17, where the "Hour Glass", main body 1 with variations; with battlements 2B, without battlements 2A and including the different faux window configurations of facing upward or downward 9A and 9B respectively which may be mixed and matched of all facing upward, all facing downward or a combination of the two on the main body 1. The raised part 15 that would fit on the rim of a glass, which may be straight parallel with the glass rim or contoured to the rim of a glass or glasses; 18 is the center part of the piece that is formed to accommodate a rubber inlay or insert or an overlay, as the overlay of rubber 19 would be hollow with the idealized contour of 18 to fit the contour of the concentric center 8 of the main body 1. 18 may be conformed to the actual design as shown in the drawings as to offer a place for the piece 19 to fit over or around the shape 18 or; 18 may be indented in such a way as to allow a separate rubber piece 19 which is solid to be inserted into the indentation 18. The material of 19 is idealized to be of rubber but not limited to this material type as some composite material may be more suitable and not limited to either material matter. FIG. 20 shows the same handle design as looking upward from the bottom. This view is showing the main body 13 of the handle apparatus used to hold the "Hour Glass" within a glass 21. This view is the view looking upward at the handle showcasing the individual parts of the handle 13. This figure highlights the main body indentation for thumb 14 in the lowest portion of the handle 20, as an indentation suitable for an ergonomic fit. It also shows the forked portion 17; the raised part of 15 that would fit on the rim of a glass; 18 is the center part of the piece that is formed to accommodate a solid rubber insert or may be hollow and wraparound the contour of 18 if so desired, as the wraparound of rubber 19 would be hollow with the idealized contour of 18. 18 may be conformed to the actual design as shown in the drawings as to offer a place for the piece 19 to fit over or around the shape 18 or; 18 may also be indented in such a way as to allow a separate rubber piece 19 which is solid to be inserted into the indentation 18. FIG. 21 is the view of the main body 13 from the left side of the said handle design with the addition of 16 which illustrates the forked part, 16, as showing this section sunken beneath the inner rim of a glass stretching from rim to rim. FIG. 22 is the main body 13, from the right side. This view as with the previous FIG. 21 shows the idealized contour of the handle as it would be placed onto a glass and receive the aforementioned "Hour Glass" within the forked part of 18. This view also shows the sunken part of 16, the raised parts of 15, which rests on one side of the glass rim and 17 on the opposite side as added support resting on the opposite side of the glass, opposite 15. 20 is the vertical portion extending from bottom part 21 to the top raised part 15. FIG. 23 is the front view as looking straight into the forked portion 17. Indentation 18; main body 13; indentation 14; vertical part 20 are also shown. FIG. 2 is the back view showing the main body 13; Indentation 14; Raised part 20; 21, where the Indentation 14 is inset; forked part of 17 and 16; and the insert of 18 and 19.

Figure 25:
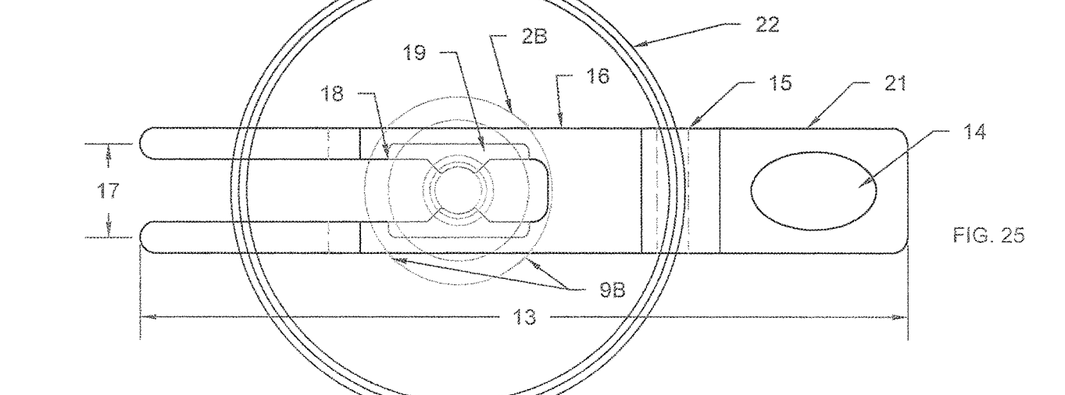
FIG. 25 shows a top view of the embodiment of FIG. 13 disposed on the apparatus of FIG. 19.
Figures 26, 27:
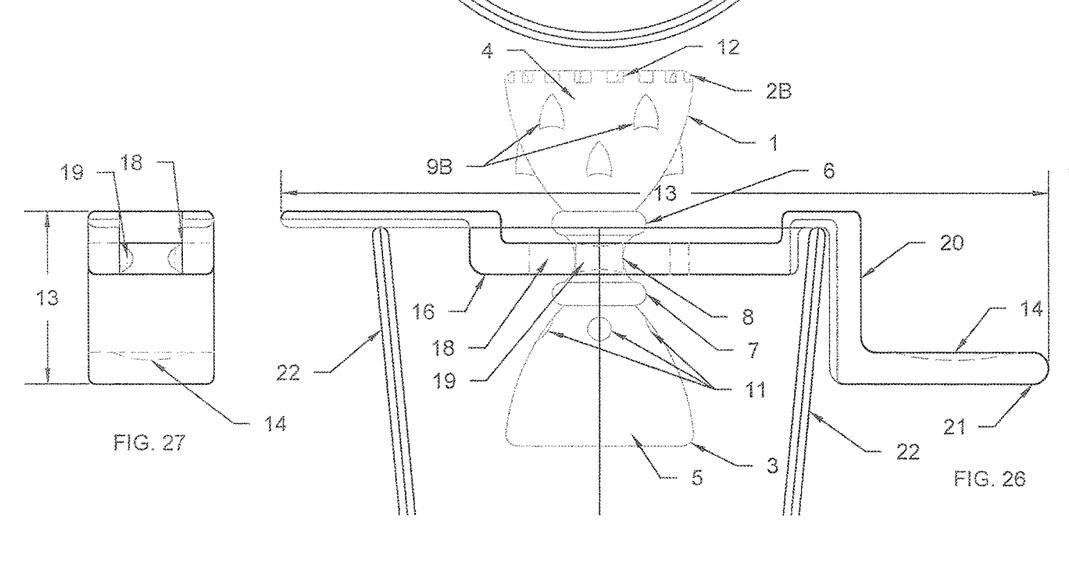
FIG. 26 shows a side view of the system of FIG. 25.
FIG. 27 shows a front view of the apparatus of FIG. 19 for immediate reference with respect to FIGS. 25 and 26.
Figure 28:
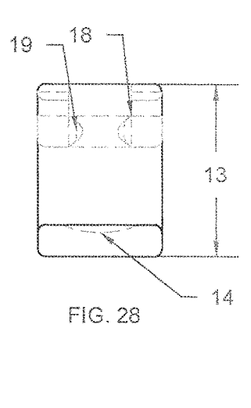
FIG. 28 shows a back view of the apparatus of FIG. 19 for immediate reference with respect to FIGS. 25 and 26.

FIGS. 25-28 show the "Hour Glass" design within the handle and resting on and within a glass at the vertical opening into the glass as illustrated. The "Hour Glass"

design and/or similar functioning components discussed herein, along with the same or similar handles discussed herein, may also be collectively referred to herein as an "apparatus" for layering drinkable fluids of different densities. The handles and similar components may also be referred to herein as a "first component," and the "Hour Glass" and similar components may also be referred to herein as a "second component." This view shows in particular the handle 13; top portion of the "Hour Glass" without the battlements 2A, as the concept of FIG. 25 and FIG. 26 illustrates that the center portion 18 may accommodate in a slot the various body concepts as to conform to the idealized concave concentric center 8; center part of the handle 18 and 19 in relation to the "Hour Glass" and the idealized temporary integration of the "Hour Glass" or "castle" shaped main body 1 with the handle 13. 18 being the center that may be indented to receive the insert 19 or formed in the "w" shape so as to receive an overlay with the same shape. FIG. 26 shows the same concept from the left side. The "Hour Glass" main body 1 having the varied design concept with the battlements 12 on the top part 2B of the main body 1; windows 9B; hollow top end 4. This view continues to show the top collar 6; concentric concave center 8; bottom collar 7. The "Hour Glass" is solid from the top collar 6 to the center 8 and bottom collar 7. The bottom portion of the "Hour Glass" 3 illustrates hole(s) 11; hollow end 5. The Hour Glass is resting in place between the forked part 17 within the grasping parts of 18 and 19 respectively. This also shows how the handle 16, dips lower than the glass rim. On the other side of the glass 22, the handle wraps around 15 and extends down along the exterior side of the glass 22 for support and stability 20 of the handle to the bottom part of the handle 21, where the thumb indentation resides. FIG. 27 is the front view of the handle 13; shows the ergonomic thumb indentation 14 on the bottom part of the handle 21 along with the Hour Glass grip components of 18 and 19 as shown. FIG. 28 is the back view of the handle 13 showing the indentation 14; Hour Glass grips 18 and 19 within the handle 13. Either end of the handle 21, or similar devices herein, which is supported by the glass 22, may be referred to as an "extension" herein. Thus, one end of the handle 21 supported by glass 22 may be a first extension, and another end of the handle 21 supported by class 22 may be a second extension. The portion in-between the extensions, or the like discussed herein, may be referred to herein as the "support portion."

Another desired aspect to the hour glass design is to have the shape of such symmetrically contoured apparatus vary and become A-symmetrical from the top to the bottom as to be less symmetrical and having the bottom portion of the said device shorter than the top. And within said design, the bottom of the device may have threads that wrap around the interior of the bottom part up to a quarter of the circumference or half, which ever best segments the design and necessary function, with equidistance of space having no threads, where the threads exist in two separate and divided segments within the interior. Each of the threads may be of varying quantities as may necessitate the optimum functionality of the device and they may also curve backwards and upwards in their place as in the similarity of but varying barbed function of lawn sprinkler barbed connectors. The necessity of said design is to facilitate the desired connection and removal of the Hour Glass/castle to the top portion of the additional handle design where the "castle" may be connected to the mirrored exterior male treads of the bottom portion of the handle in accompaniment of said device. Atop of the handle the threads may be of the same configuration as the interior of the hour glass where the threads are in the male counterpart designed to receive the threads of the female portion within the hour glass. This desired design may function as a holding of the two separate pieces in a snapping together of the hour glass/castle to combine them into one comprehensive piece to accomplish its function as to layer the beer accordingly.

Handle having a solid design instead of the fork design to hold the Hour Glass above the glass or as to dip just below the glass and allowing a minimal infraction upon the head or froth of the beer. The handle is to hold the design in the way as to have the following. The handle is to have the center in a convex design and in the convex design is to have threads extending upwards and the threads are to encompass two halves of a circle and two halves of the circle to have no threads or the absence of The threads are to be used as a snapping into place and then twisting off in the absence of the thread as in a snapping into place and then a twist and turn in the removal of the device where the threads are absent.

The windows may also vary in the way as to symbolize that of a shield or stylized window, in that it may have a squared top but not limited to said design, may also slightly rounded and or tilting at a desired angle and half way down start tapering to a point.

Another desired concept in the introduction of a separate device designed to hold said Hour Glass which may or may not incorporate a handle attached to it.

Figure 29:
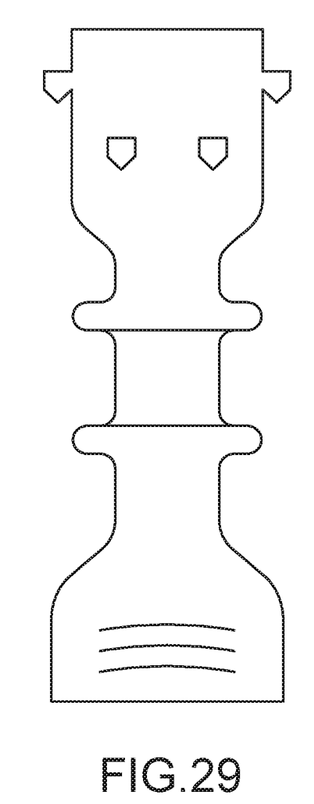
FIG. 29 shows a front view of a fourth apparatus embodiment of the invention for layering fluids in a container.
Figure 30:
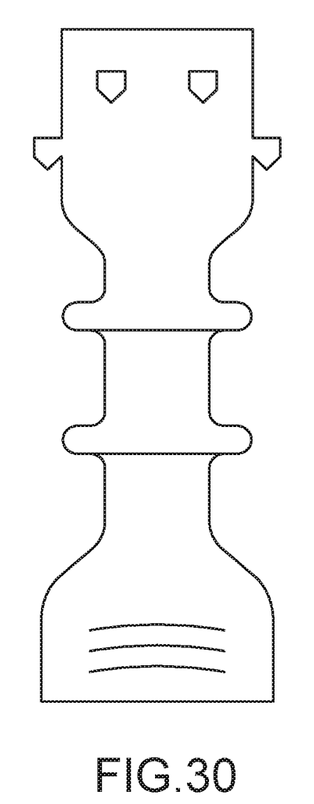
FIG. 30 shows a side view of the apparatus of FIG. 29.
Figure 31:
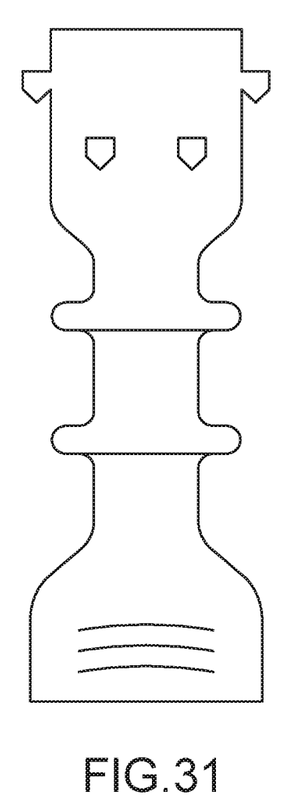
FIG. 31 shows a back view of the apparatus of FIG. 29.

In an addition to the drink layering concept as envisioned, the bottom portion of the Hour Glass may have the following configuration. Within the bottom part of said device the interior portion 5 may contain threads 22 that may wrap around the interior of 5b as showing in FIG. 29 and FIG. 31 (as well as FIGS. 39-41, discussed below), where the said threads may be segmented and wrap around as needed but not fully as to allow the hour glass to be snapped on one way and then twisted off another way as shown and indicated in FIG. 30 and FIG. 40 in the absence of said referred to threads as to secure the device to the handle 13 and then may be twisted off in the absence of threads of both the handle and the Hour Glass/Castle drink layering device to remove and or separate them as in FIG. 30 (as well as FIG. 40, discussed below). This design may be referred to as "partially threaded" herein. The handle 13 shall have the mirrored thread design where the threads 23 will overlap and interlock with the interior threads of the interior cavity of the bottom portion of the hour glass drink layering device 5. The Handle 13 may have the alternative configuration where the center portion of the handle 13 may be solid in place of the holder 18 and 19 respectively. This other concept may be convex as the threads being a part of the handle or separate will be centered. The forks 17 may also remain or be of the solid extension of the handle 13. The threads 23 extending from the handle center. FIG. 29 and FIG. 31 show the placement of the threads as desired along two opposite sides of the interior portion of 5b, whereas FIG. 30 is showing the absence of the threads along the other two adjacent sides of the interior 5b as described above.

Figures 32, 33, 34, 35:
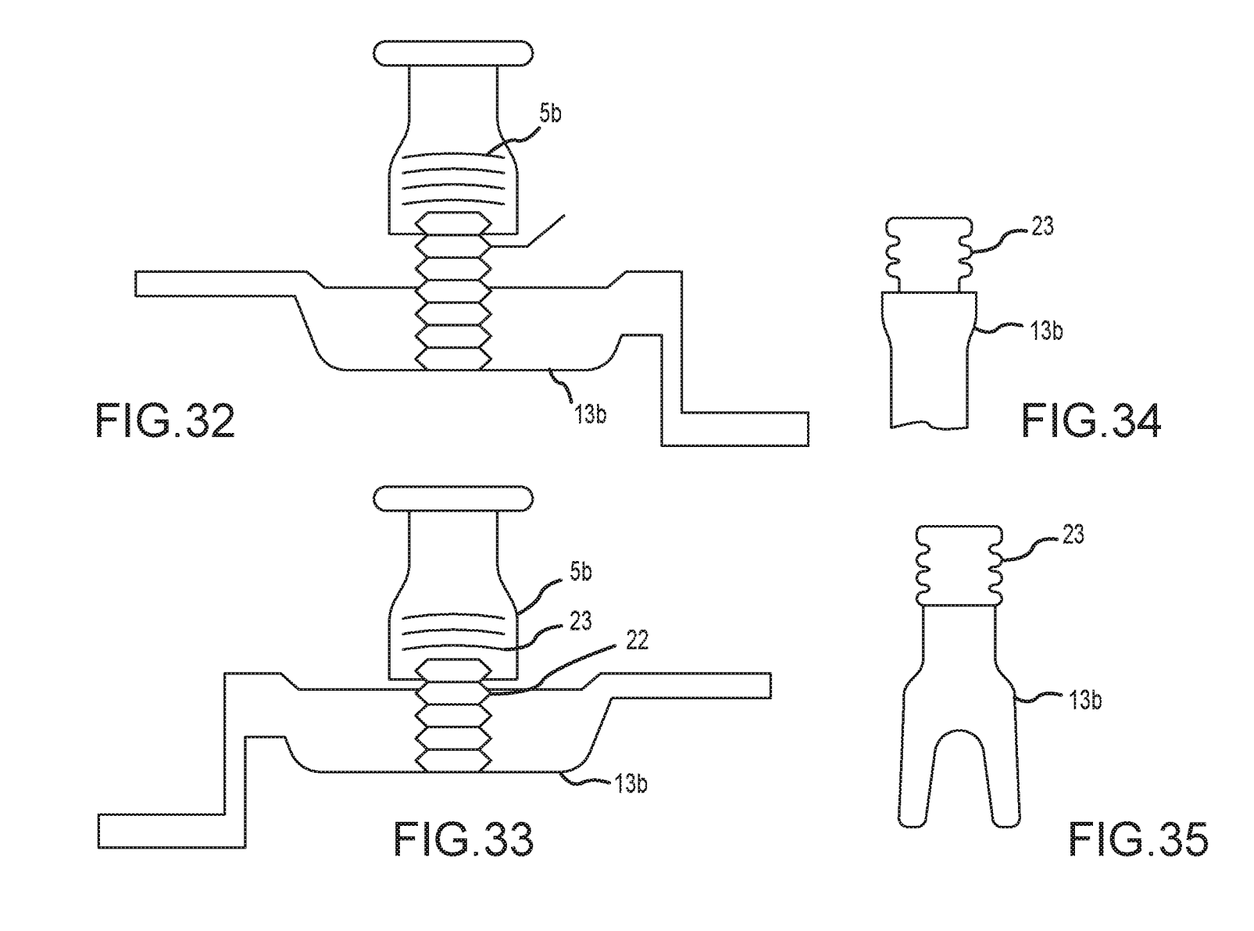
FIG. 32 shows a side view of a system embodiment of the invention for layering fluids in a container.
FIG. 33 shows an opposite side view of the system of FIG. 32.
FIG. 34 shows a front view of the handle apparatus from FIG. 31.
FIG. 35 shows a back view of the handle apparatus from FIG. 31.
Figures 36, 37, 38:
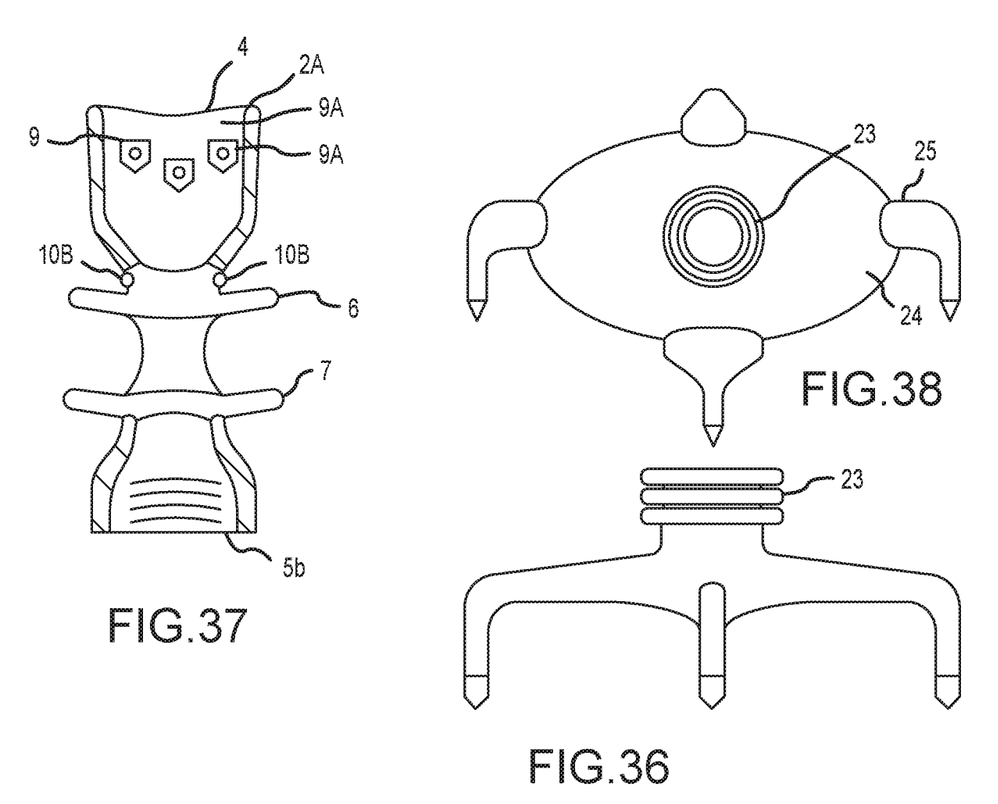
FIG. 36 shows a side view of another apparatus of the invention for holding a device which allows for layering of fluids in a container.
FIG. 37 shows a side view of a fifth apparatus embodiment of the invention for layering fluids in a container.
FIG. 38 shows a perspective view of the apparatus of FIG. 36.

FIG. 32 and FIG. 33 show the ideal method of attaching the Hour Glass/castle drink layering apparatus to the handle 13b where the handle may be but not limited to being solid where the threads are located on the handle and the fork portion 17 may still be used and may remain forked and not solid, yet may also be solid if found necessary. FIG. 34 and FIG. 35 show the threads that extend from the handle to be existing on the left and right sides of the drawing but intentionally missing front and back as to allow the device to be removed from a snapped-on position. The threads may be of one solid continuance of the handle or may be of a separate piece as deemed necessary for manufacture. The desired concept may include any combination of all concepts insinuated within this document as described and not limited to any particular configuration but not withstanding all parameters and said implied and stated perimeters of said concept. FIG. 36 and FIG. 38 show an additional concept with a convex designed center portion that may act as a holder/handle for the drink layering device in place of the previous handle design as described but only as a secondary concept and may be used as an either/or concept for the forked handle where the device of FIG. 37 may connect atop FIG. 36. FIG. 36 may be of one solid construction having the legs ("extensions") that wrap over the top of the glass as in other drink layering devices except for having the segmented threads as previously mentioned.

Figure 39:
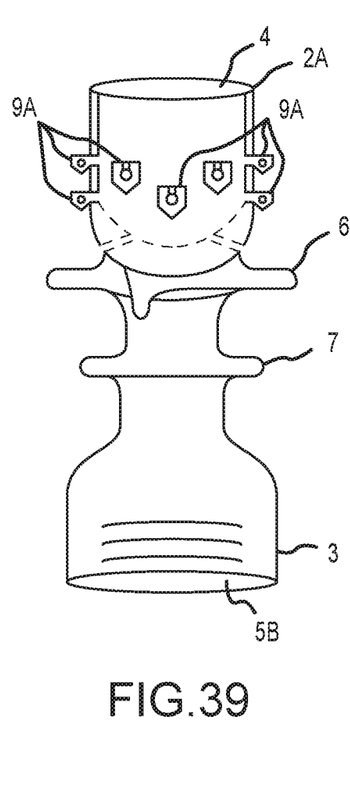
FIG. 39 shows a front view of a sixth apparatus embodiment of the invention for layering fluids in a container.
Figure 40:
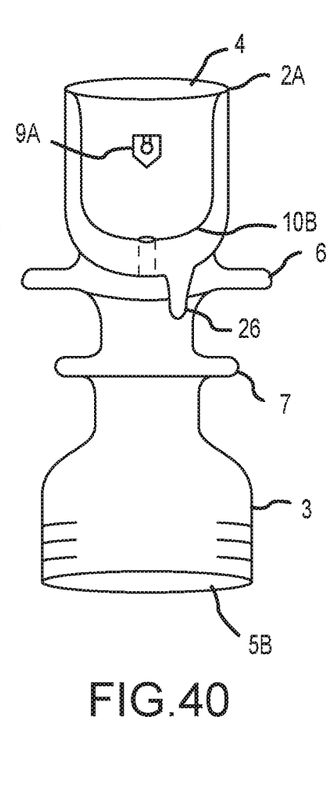
FIG. 40 shows a front view of a seventh apparatus embodiment of the invention for layering fluids in a container.
Figure 41:
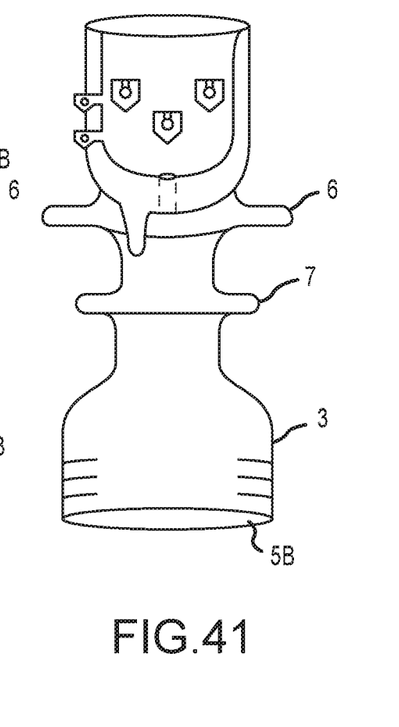
FIG. 41 shows a front view of a eighth apparatus embodiment of the invention for layering fluids in a container.

FIGS. 39-41 are illustrating variations in the collars, 6 and 7 which may be of varying widths past the width of the main body of the Hour Glass and each other. In FIG. 39 the illustration shows how the top collar 6 extends past the bottom collar 7 and the width of the main body. FIG. 39 is also showing how the bottom 3 may be of equivalent size to the top portion 2A. It may also indicate the threads of 5B to wrap around partial way in front of said Hour Glass structure. Where in the next FIG. 40 indicates both 3 being of shorter and wider in comparison to that of the top part 2A. In addition to the upper collar 6 there may be a wedge-shaped dip 26 or notch within the collar 6 that may aid in additional drainage as may be necessary in the furtherance of the design. FIG. 39 may be one view looking onto the side of the Hour Glass; FIG. 40 would be the view as looking at the device as turned one quarter turn to the right or left as it would remain the same from one side to the opposite side of the design. All windows, ports and drainage aids 26 may be offset from each other as illustrated within the concept of such beer layering apparatus. Each of FIGS. 39-41 has an invisible "vertical axis" extending from the bottom of the shown devices to the top of the shown devices, substantially through the center of the devices.

Figure 42:
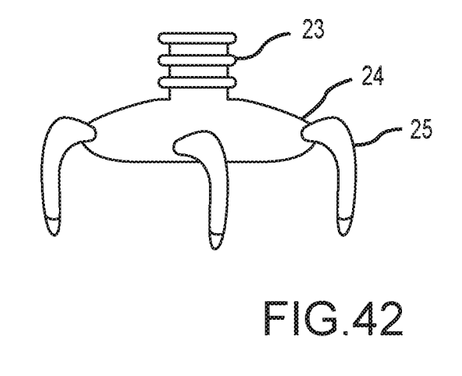
FIG. 42 shows a side view of another apparatus of the invention for holding a device which allows for layering of fluids in a container.
Figure 43:
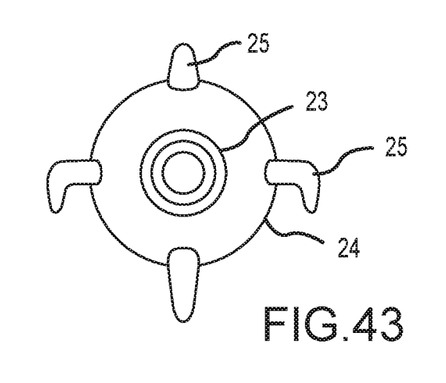
FIG. 43 shows a perspective view of the apparatus of FIG. 42.
Figure 44:
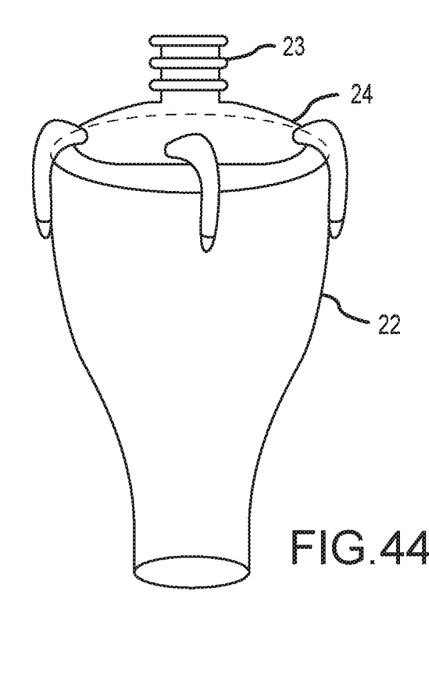
FIG. 44 shows the apparatus from FIG. 42 on top of a container (i.e., glass).

FIG. 36 and FIG. 38 are showing yet another concept holding device used to hold the Hour Glass/castle in place while in use over the center of the glass while pouring the second beer into the glass of choice. FIG. 36 is showing one view where the threads are complete and not missing where FIG. 42 and FIG. 43 show the same apparatus holding device as turned slightly to the right or left where 23 will and may have no such threads but be absent of and of a smooth nature allowing the removal of the hour glass 1 from the aperture 23 and main body of the 2nd holder 24 as 23 and 24 may be of one fashioned piece or of two separate pieces. The 2nd holder FIG. 42 and FIG. 43 will also and is showing extensions 25 that may be of at least four or more extensions for hugging the sides of the glass for security and stability so the hour glass 1 and the handles 21, and 24 will stay in place atop of desired glass. FIGS. 39, 40 and 41 will also show another such concept as having the drain hole 10B above the first collar and at the bottom of the top part 2A that may extend from the interior to the exterior of the device and may pour into the first collar 6, where within the first collar 6 in FIGS. 39, 40 and 41 the collar having a wedge 26 or indentation that may allow any liquid to collect and continue to fall as a pathway for any remaining liquid to flow if necessary. FIG. 44 shows the device of FIG. 42 and FIG. 44 on top of a glass or other similar container.

All desired and envisioned conceptual designs included in the drawings may have variance within the scope of the said and indicated function regarding size, placement and contour of the whole and of the individual identifiers within the desired and said concept. Regarding the threads 23 and within the Hour Glass/Castle of the main body 1 being the bottom part 5B, the interior threads may have the leeway to fully encompass the interior entirely and as well as the matching devices of FIGS. 42, 43 and 32 and 33 as shown and may allow for a clockwise twist on and a counter clockwise twist off motion but is not restricted to such limitation but may vary, but not outside of the scope of the said concept. The bottom part of the main body may also have the leeway to vary in width and height. All said and referenced items within the scope of the apparatus may also be interchangeable where deemed necessary for the furtherance of the functional purpose of said device.

The invention has now been described in detail for the purposes of clarity and understanding. However, it will be appreciated that certain changes and modifications may be practiced within the scope of the appended claims.

What is claimed is:

1. An apparatus for layering drinkable fluids of different densities in a drinking container, wherein the apparatus comprises:
   a first component, wherein:
      the first component comprises:
         a first extension;
         a second extension; and
         a support portion disposed between the first extension and the second extension; and
      the first extension and the second extension are configured to be supported by a top of a drinking container such that when the first extension and the second extension are supported by the top of the drinking container, the support portion is disposed at a vertical opening into the drinking container;
   a second component wherein:
      the second component comprises:
         an upper portion defining a basin and a plurality of apertures extending between the basin and an exterior of the upper portion;
         a middle portion; and
         a lower portion; and
      the lower portion or the middle portion is configured to be coupled with the support portion of the first component to suspend the second component at the vertical opening into the drinking container;
   wherein the first component further comprises an at least partially threaded vertical extension; and
   wherein the lower portion of the second component defines a vertical receptacle which is at least partially tapped to mate with the at least partially threaded vertical extension.

2. The apparatus for layering drinkable fluids of different densities in a drinking container of claim 1, wherein:
   the first component further comprises:
      a third extension;
      a fourth extension; and
      a center portion having a convex top coupled between the first extension, the second extension, the third portion, and the fourth portion; and
   the third extension and the fourth extension are configured to be supported by the top of the drinking container.

3. The apparatus for layering drinkable fluids of different densities in a drinking container of claim 1, wherein:
   the support portion of the first component defines a slot configured to accept the middle portion of the second component.

4. The apparatus for layering drinkable fluids of different densities in a drinking container of claim 1, wherein:
the middle portion of the second component comprises a first collar extending radially away from a vertical axis of the second component.

5. The apparatus for layering drinkable fluids of different densities in a drinking container of claim 4, wherein:
the first collar defines a notch extending from a top of the first collar to a bottom of the first collar.

6. The apparatus for layering drinkable fluids of different densities in a drinking container of claim 4, wherein:
the middle portion of the second component comprises a second collar, below the first collar, extending radially away from the vertical axis of the second component.

7. The apparatus for layering drinkable fluids of different densities in a drinking container of claim 6, wherein:
the first collar and the second collar extends radially away from the vertical axis to an equivalent distance.

8. The apparatus for layering drinkable fluids of different densities in a drinking container of claim 6, wherein:
the first collar extends further radially away from the vertical axis than the second collar.

9. The apparatus for layering drinkable fluids of different densities in a drinking container of claim 6, wherein:
the second collar extends further radially away from the vertical axis than the first collar.

10. An apparatus for layering drinkable fluids of different densities in a drinking container, wherein the apparatus comprises:
a first component, wherein:
the first component comprises:
a first extension;
a second extension; and
a support portion disposed between the first extension and the second extension; and
the first extension and the second extension are configured to be supported by a top of a drinking container such that when the first extension and the second extension are supported by the top of the drinking container, the support portion is disposed at a vertical opening into the drinking container;
a second component wherein:
the second component comprises:
an upper portion defining a basin and a plurality of apertures extending between the basin and an exterior of the upper portion;
a middle portion; and
a lower portion; and
the lower portion or the middle portion is configured to be coupled with the support portion of the first component to suspend the second component at the vertical opening into the drinking container;
wherein:
the lower portion has a greater diameter about a vertical axis of the second component than the upper portion.

11. An apparatus for layering drinkable fluids of different densities in a drinking container, wherein the apparatus comprises:
a first component, wherein:
the first component comprises:
a first extension;
a second extension; and
a support portion disposed between the first extension and the second extension; and
the first extension and the second extension are configured to be supported by a top of a drinking container such that when the first extension and the second extension are supported by the top of the drinking container, the support portion is disposed at a vertical opening into the drinking container;
a second component wherein:
the second component comprises:
an upper portion defining a basin and a plurality of apertures extending between the basin and an exterior of the upper portion;
a middle portion; and
a lower portion; and
the lower portion or the middle portion is configured to be coupled with the support portion of the first component to suspend the second component at the vertical opening into the drinking container;
wherein:
the upper portion comprises a plurality of protrusions, and each of the plurality of apertures extends through one of the plurality of protrusions.

12. The apparatus for layering drinkable fluids of different densities in a drinking container of claim 1, wherein:
the upper portion comprises a protrusion extending away from the exterior of the upper portion.

13. The apparatus for layer drinkable fluids of different densities in a drinking container of claim 12, wherein:
one of the plurality of apertures extends through the protrusion.

14. The apparatus for layer drinkable fluids of different densities in a drinking container of claim 13, wherein:
the one of the plurality of apertures which extends through the protrusion opens to a top side of the protrusion.

15. The apparatus for layer drinkable fluids of different densities in a drinking container of claim 14, wherein:
the protrusion is narrower on a bottom side of protrusion and wider on the top side of the protrusion.

16. The apparatus for layer drinkable fluids of different densities in a drinking container of claim 13, wherein:
the one of the plurality of apertures which extends through the protrusion opens to a bottom side of the protrusion.

17. The apparatus for layer drinkable fluids of different densities in a drinking container of claim 16, wherein:
the protrusion is narrower on a top side of protrusion and wider on the bottom side of the protrusion.

18. The apparatus for layering drinkable fluids of different densities in a drinking container of claim 1, wherein:
the upper portion further defines at least one drain conduit extending from a bottom of the basin to the exterior of the upper portion.

* * * * *